L. MAMBOURG.
PROCESS OF SMELTING AND REFINING ORE.
APPLICATION FILED JUNE 10, 1918.

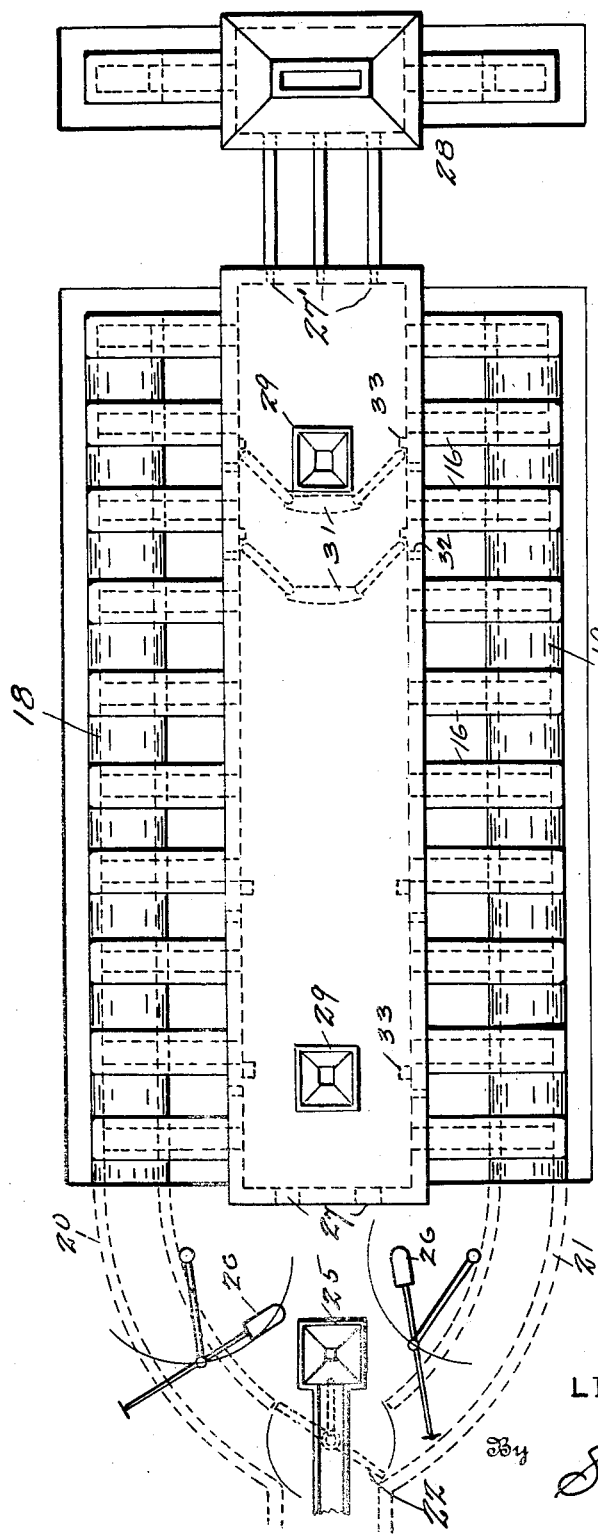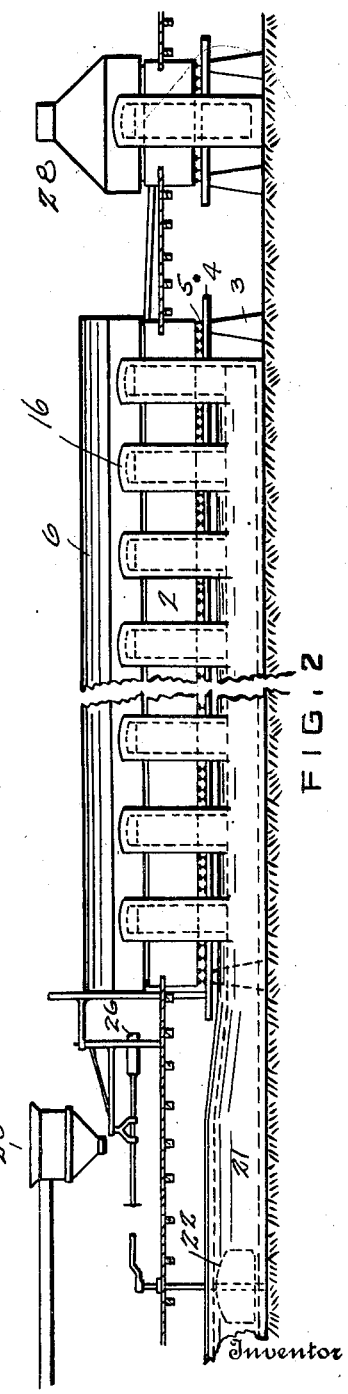

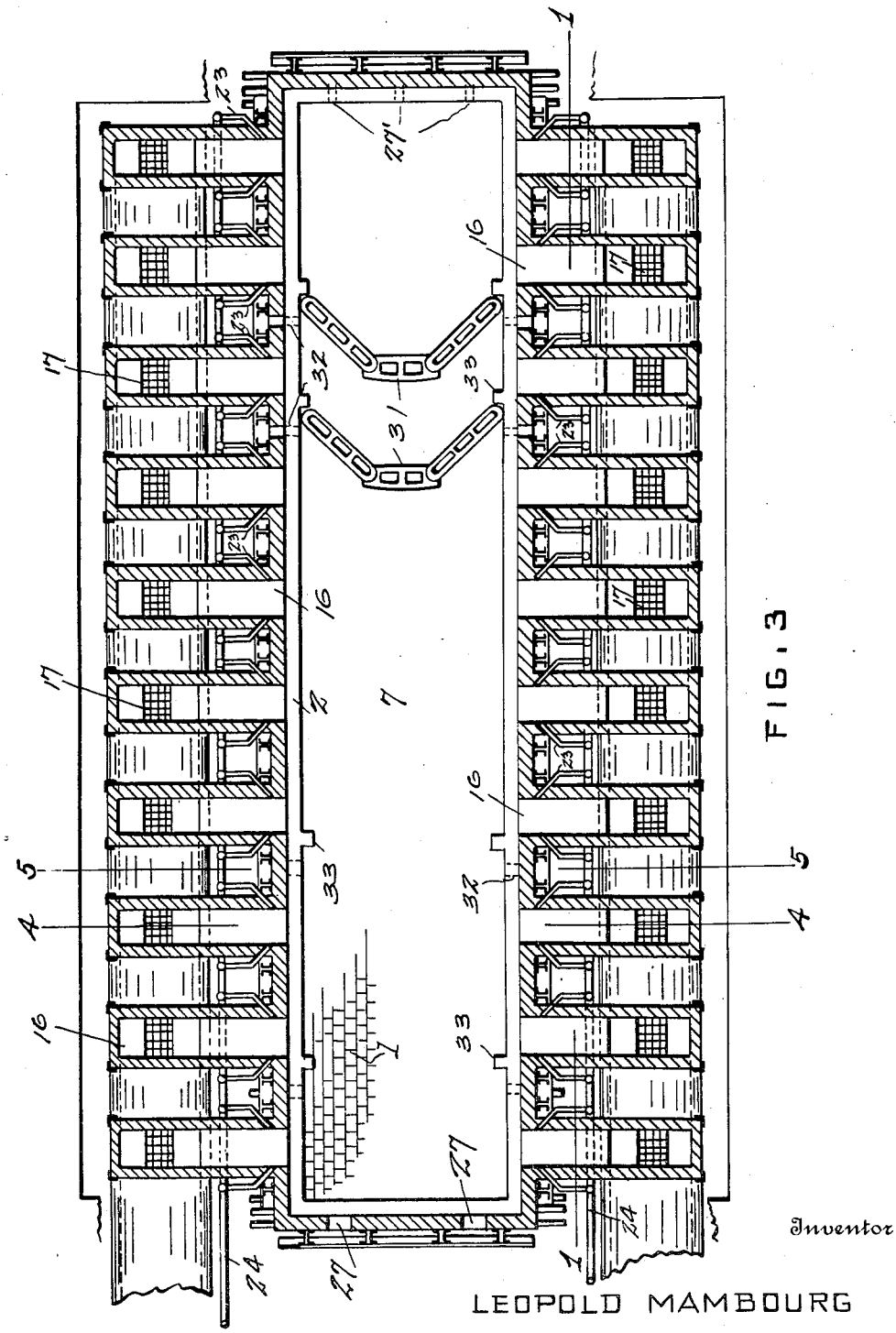

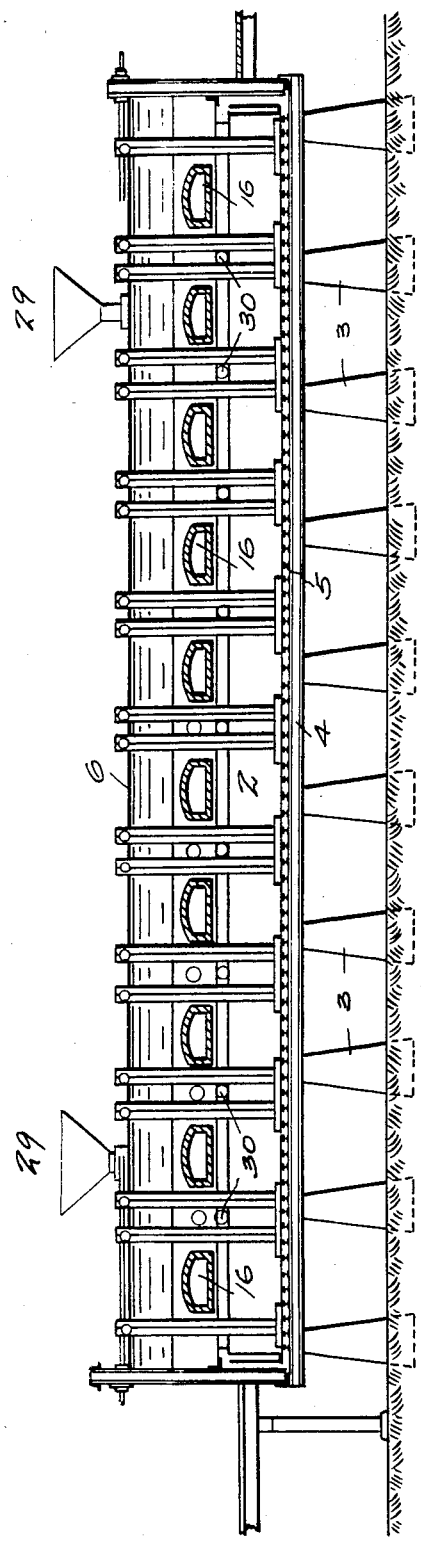
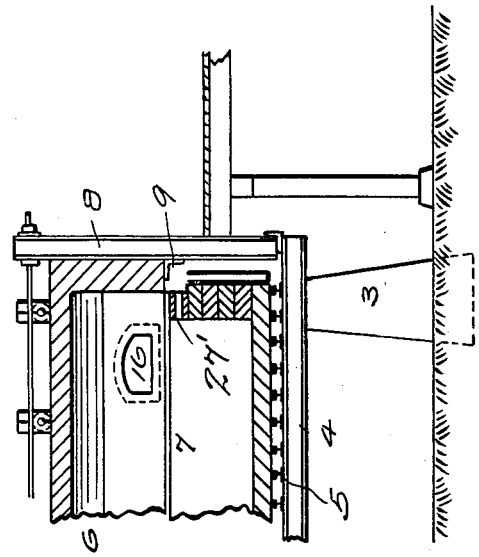
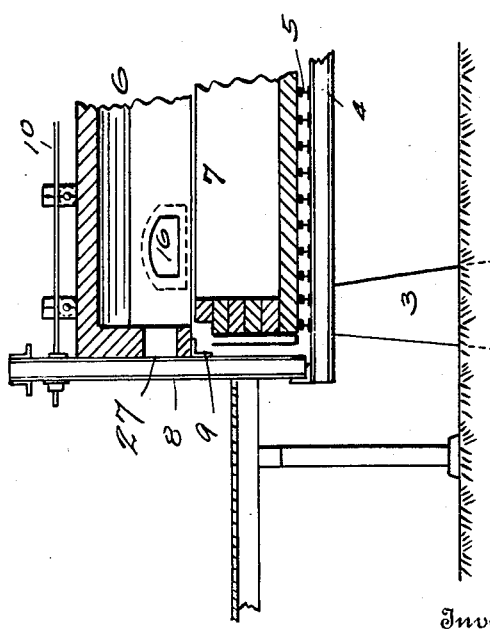

1,313,309.

Patented Aug. 19, 1919.
6 SHEETS—SHEET 4.

Inventor
LEOPOLD MAMBOURG

By Shigley & Harney.
Attorney

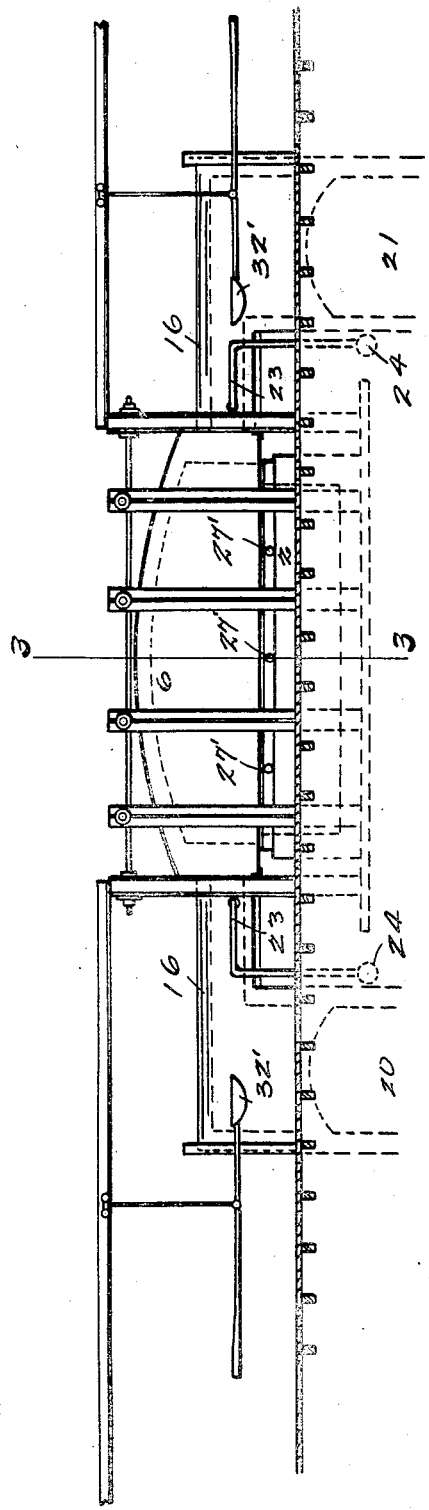
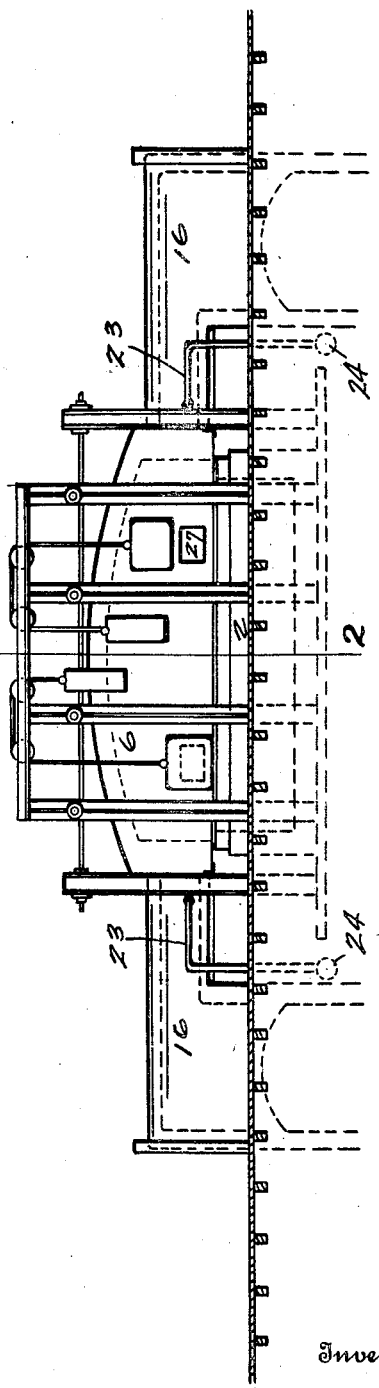

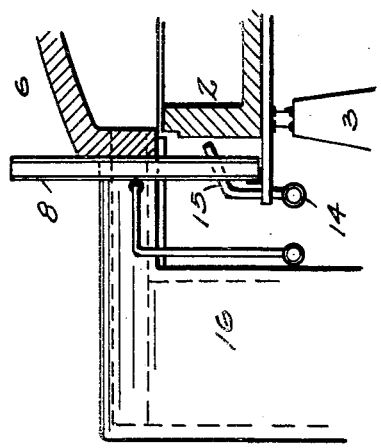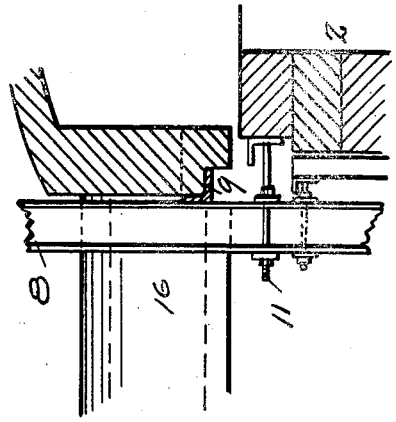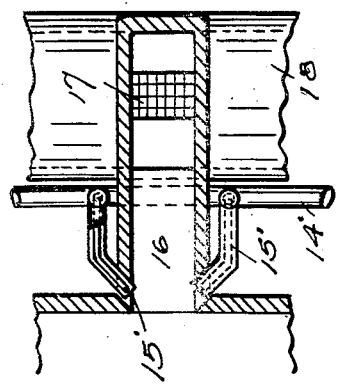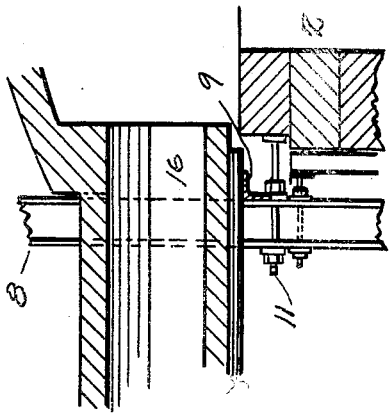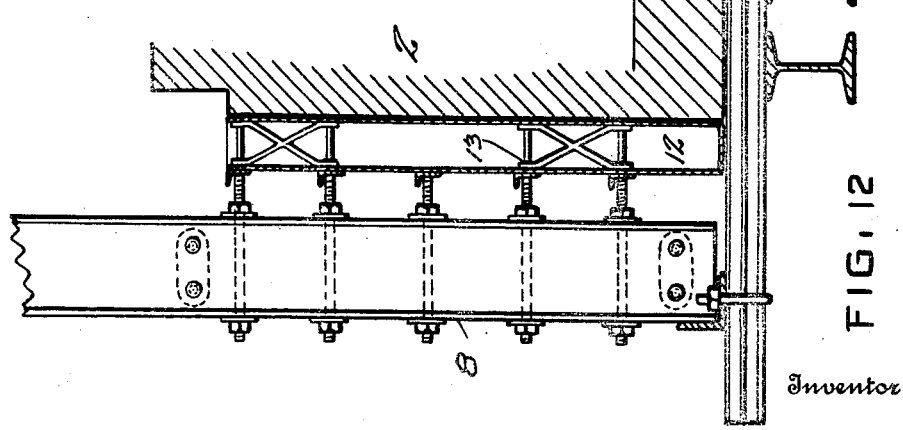

UNITED STATES PATENT OFFICE.

LEOPOLD MAMBOURG, OF LANCASTER, OHIO, ASSIGNOR TO THE MAMBOURG CONTINUOUS IRON AND STEEL FURNACE CO., OF LANCASTER, OHIO.

PROCESS OF SMELTING AND REFINING ORE.

1,313,309.                 Specification of Letters Patent.       Patented Aug. 19, 1919.

Application filed June 10, 1918. Serial No. 239,231.

*To all whom it may concern:*

Be it known that LEOPOLD MAMBOURG, a citizen of the United States of America, residing at Lancaster, in the county of Fairfield and State of Ohio, has invented certain new and useful Improvements in Processes of Smelting and Refining Ore, of which the following is a specification.

The present invention relates to an improved process of smelting and refining ore, and involves the utilization of a continuous smelting furnace particularly designed for the production of iron from its ore.

The primary object of the invention is the advanced step in the production of iron whereby time is saved, fuel economized, the cost of production materially reduced, slow and intermittent treatments eliminated, and the resulting product is a better grade and purer quality of iron than that usually attained in the customary ways of treating iron ore.

The invention consists essentially in providing in a continuous melting furnace, a molten bed or bath into which a mixture including iron ore, a flux and the necessary fuel, is fed, and continuously and constantly heating the whole contents of the furnace from the inlet or supply point of the raw material, to the discharge place of the refined iron, and in certain other subordinate features and steps as will be hereinafter pointed out and claimed.

In the accompanying drawings one complete example, and modifications thereof, are illustrated, to exemplify the physical embodiment of the invention, the furnace being constructed, arranged, and operated according to the best mode I have so far devised for the accomplishment of the process involved in the principles of the invention.

In order that the invention may be readily comprehended and its principles understood I have utilized the accompanying drawings which depict a well known type of continuous melting furnace.

Figure 1 is a top plan view of a furnace embodying the construction necessary to carry out the steps of the improved process.

Fig. 2 is a side elevation of the furnace.

Fig. 3 is an enlarged, horizontal sectional view of the furnace, omitting some connections, showing air ports communicating with the furnace chamber, the arch top being removed for the purpose, and the gas burners are also shown, ranged along the two sides of the furnace chamber and communicating therewith through the inner end of the air ports.

Fig. 4 is a sectional view through the furnace on line 1—1 of Fig. 3.

Fig. 5 is an enlarged, sectional, broken longitudinal view of the furnace, at line 2—2 of Fig. 9, showing the construction of the feeding end of the furnace.

Fig. 6 is a view similar to Fig. 5, but showing the opposite or discharge end of the furnace, at line 3—3 of Fig. 8.

Fig. 8 shows an elevation of the tank at the discharge end.

Fig. 9 is an elevation of the furnace at the feeding end.

Fig. 10 is an enlarged, detail sectional view through one of the air ports, showing also the manner of replacing worn blocks of the side walls of the furnace.

Fig. 11 is a sectional view similar to Fig. 10, but at line 5—5 of Fig. 3.

Fig. 12 is an enlarged detail view showing the construction and arrangement of jack stays and water jacket that surround the furnace.

Fig. 13 shows a modified form or arrangement of burner incased in air blast pipes that are used under some conditions.

Fig. 14 shows a modification in the cooling means for the furnace walls in which air is used instead of the water jacket.

Figure 7:
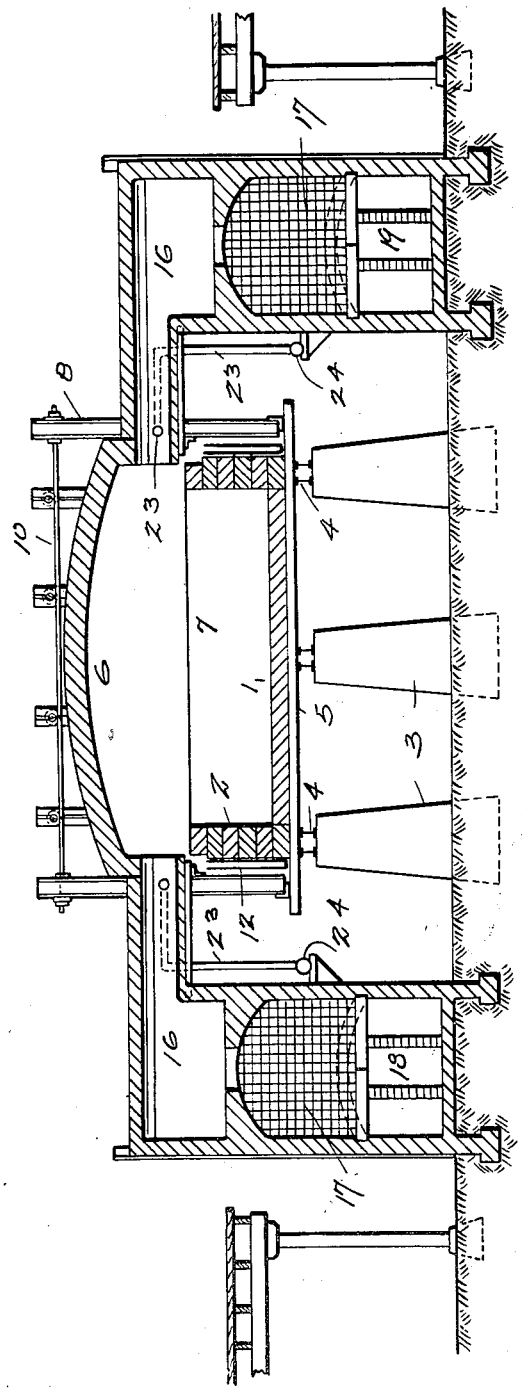
Fig. 7 is a transverse, sectional view of the furnace, on line 4—4 of Fig. 3.

The type of furnace employed is a continuous, horizontal furnace, in which the furnace bed, comprising the bottom 1 and walls 2 are constructed as usual of blocks of refractory material, is supported above the ground level on the vertical piers 3 through the instrumentality of the longitudinal girders 4 and transverse beams 5, both made from metallic I-beams.

The arch top or cover 6 of the furnace is composed of bricks, and is supported over the furnace chamber 7 independently of the furnace walls, on the buck-stays 8 and brackets 9, the usual struts 10 being employed for bracing.

Preferably the upper layer of blocks of the walls 2 of the furnace bed, are provided with means, as screw bars 11 for pushing these blocks in toward the interior of the furnace, to compensate for wear or burning of these blocks at the fusion line. To reduce the temperature of the exterior face of the furnace walls, a water jacket 12 is employed, as best seen in Fig. 12, the jacket being supported between the buck-stays and the chamber walls, and provided with separator brackets 13 to prevent crushing. In Fig. 14, the same result is attained by utilizing air pipes 14 distributed around the furnace with nozzles 15 to furnish a circulation of air, instead of water, and other desirable and necessary mechanical expedients are employed for operating the furnace according to the process, which need not be described herein.

The invention as depicted in the drawings contemplates the utilization of a constant and continuous heat from one end of the furnace bed to its other end, and therefore I employ, along both sides of the length of the furnace chamber, and communicating therewith successive air ports 16 that communicate, through the usual checkerwork construction 17 with the duplex air channels 18 and 19 and their tunnels 20 and 21, the direction of suction or draft through these tunnels and channels being controlled by the valve 22 in Figs. 1 and 2.

The heat for the furnace is provided in conjunction with the air ports, through the burners or nozzles 23, of the gas supply pipe 24, and arranged in pairs to furnish the gas and air through the mouth of the air ports to the interior of the furnace chamber, and, preferably, across the surface of the molten mass therein.

A preferred arrangement for furnishing the raw material and running off the molten metal is illustrated in the drawings which show, especially in Figs. 1 and 2, a supply hopper 25, and a pair of pivoted or swiveled shovels 26 by means of which the raw material may be conveyed to and through the inlet or charge openings 27 at one end of the furnace, and at the other end of the furnace the discharge may be run off through one, or all three, of the discharge openings 27′ and disposed of as desired according to the plan of Figs. 3 and 8, while in Figs. 1 and 2 the molten metal may be conveyed to an auxiliary or supplemental furnace 28 for further treatment if required.

While this arrangement for feeding and discharging just described, is a preferred one, it will however, be apparent that I can feed the raw material at other places in the furnace, as for instance through the top by means of a hopper 29, and this hopper may be located at various places, and I further contemplate tapping or drawing off molten metal at other desirable places, as indicated by the several openings 30 in Fig. 4.

For purposes of visualizing a concrete example, however, of the steps in the process of smelting and refining the ore it is herein assumed that the raw material as iron ore, limestone and coke are fed into the furnace from the left end in Figs. 1 and 2, and drawn off or discharged in molten mass at the right or discharge end in these figures.

A pair of "floaters" or buoyant dams 31 are illustrated in Fig. 3, to intercept the slag or other foreign matter, the floaters being somewhat V-shaped with their apices toward the feed end of the furnace in order that the slag may be diverted toward the openings indicated at 32 in the side walls of the furnace and withdrawn therethrough by means of ladles 32′. It will be noted that the projections or anchorages 33 at the top edge of the side walls are arranged in pairs between the two ends of the furnace so that the floaters may be positioned as desired to secure the best results under different conditions of use.

The duplex arrangement of air tunnels and channels permits the introduction of air and heat from alternate sides of the furnace, the gases of combustion being conducted to the stack (not shown) and controlled or directed by the valve or damper 22, and the introduction of fuel gas and air at any desired point or points along the length of the furnace, permits of a facile and accurate control of the heat as applied to the contents of the furnace.

To start the operation of the furnace, scrap iron is first introduced thereto and melted, by the fuel gas, to form a molten bed or bath, and into this bed or bath the raw material is introduced.

The raw material comprises the iron ore, a flux and a minimum amount or quantity of fuel, as coke, but the amount of coke required is reduced to a minimum, the heat for reducing, smelting and refining being supplied solely by the gas burners. Preferably the ore utilized is in a finely divided state, as are also the limestone and coke, and these materials are thoroughly mixed and commingled by proper devices preparatory to being fed to the furnace through the hopper and shovels, which are shown at the charging end of the furnace in Figs. 1 and 2. The continuous operation of the furnace comprises the charging, in suitable quantities, of the raw material at the left end of the furnace, and the introduction of the raw material to the molten mass or bath in the furnace is immediately followed by the smelting of the material and its absorption by the molten mass. As the discharge takes place at the opposite end of the furnace, it will be evident that there is a continuous movement or flow of the molten metal from the charging end of the furnace to the discharging end thereof, and as each burner, at one side of the furnace, is constantly supplying heat to the surface of the molten metal, the moving metal is under both a constant and continuous heat throughout its entire passage through the furnace, and any required amount of heat and air, within limits, may be applied to the metal in the furnace.

Several different grades of metal or iron may be withdrawn from the furnace, at the same time, by utilizing the tap holes or discharge openings indicated by the numeral 30 located along the sides of the furnace, because of the diversity of treatment accorded the metal in different parts of the furnace as it passes therethrough. For instance, a certain grade of iron may be withdrawn from the molten mass at a distance of thirty or forty feet from the charging place; a second grade, of higher quality may be secured by tapping the furnace at a point ten feet beyond the first place, and still a higher grade of iron may be withdrawn from the furnace at a point nearer the discharging end in Fig. 1. The different grades or quality of metal are produced by the difference in the duration of time the melted material is subjected to the heat of the furnace, the longer the travel or movement of the molten metal and the greater the exposure to heat, resulting in a more refined and purer quality of iron, and because of the characteristics of the furnace which permit a continuous operation, it will readily be apparent that the output of the furnace is of maximum capacity. The complete smelting and refining of the ore in the one furnace without the customary transfer from place to place now required in the production of iron in the usual blast furnaces, reduces both time and labor required in the treatment of the material. To a great extent, the necessity for the presence of coke or other fuel in the raw material is eliminated, and the amount of slag resulting from the fusion of the metallic ore, is greatly reduced, and as the fusion line is maintained at a practical uniform level, not only is the slag removed with facility, but the discharge of iron is uniformly at the same level of the bed.

What I claim is:—

1. The process of smelting ore which consists in providing a bed of molten metal, continuously adding a mixture including ore, a flux and a fuel, continuously heating the mixture in the bed to maintain the whole in a molten mass, separating the slag from the molten metal, and continuously withdrawing molten metal from the bed.

2. The process of treating iron ore which consists in providing a bed of molten metal, continuously adding a mixture including iron ore, a flux and fuel, continuously heating the mixture in the bed to maintain the whole in a molten mass, separating the slag from the molten metal, and continuously withdrawing molten metal from the bed.

3. The process in the production of iron which consists in providing a bed of molten metal in a furnace, continuously adding a mixture including iron ore, lime stone, and coke, continuously heating the whole to maintain a molten mass, separating the slag from the metal, and continuously withdrawing molten metal from the bed.

In testimony whereof he affixes his signature.

LEOPOLD MAMBOURG.